Oct. 26, 1965   V. VOLPE   3,213,488

POULTRY LEG AND OIL GLAND REMOVER

Filed March 16, 1964

VINCENT VOLPE
INVENTOR.

BY J. O. St. Palley
Patent Agent

United States Patent Office 3,213,488
Patented Oct. 26, 1965

3,213,488
POULTRY LEG AND OIL GLAND REMOVER
Vincent Volpe, Guilford, Conn., assignor to
Jarvis Corporation, Hartford, Conn.
Filed Mar. 16, 1964, Ser. No. 352,092
14 Claims. (Cl. 17—11)

My invention relates to poultry processing machines and more particularly to machines having the double functions of the separation and removal of the legs and the oil gland of the poultry carcass.

In the processing of poultry carcasses the proper removal of the inedible parts is of great importance as it affects the quality and the market value of the poultry. One of the necessary operations in the processing is the separation of the leg joints and the removal of the legs of the poultry carcass. It is highly essential that this operation should be performed without rupturing the bone structure of the severed joint of the carcass because this would reduce the keeping qualities of the carcass; the sharp ends of the ruptured bone may also cause injury when handling the poultry carcass. Another necessary operation in the processing of the poultry carcass is the separation and removal of the oil glands which, if not removed completely, would spoil the flavor of the poultry. The satisfactory removal of the oil glands, however, requires very accurate positioning of the cutting tool, which cannot be obtained when the carcass is carried by the customary overhead conveyor. Because of this, the present practice is to perform the removal of the oil gland manually, which means a higher operating cost in the processing of the poultry.

The principal object of my invention is to provide a machine which can perform these two essential operations of the poultry processing: the removal of the legs and the oil glands, entirely automatically, thereby reducing considerably the cost of the processing.

Another important object of my invention is to provide a machine for the separation and removal of the legs and the oil glands of the poultry carcass in which a novel cutting means will safely separate the leg joints without rupturing the bone structure of the joint of the carcass and simultaneously, the same cutting means will accurately position the carcass so as to make the proper and complete removal of the oil gland of the carcass possible.

A further important object of my invention is to provide an automatic machine for the separation and the removal of the legs and the oil gland of the poultry carcass which can be adapted to cooperate with existing conveyors and poultry processing systems, and which is reliable in operation and economical in maintenance.

Other objects and advantages of my invention will be apparent during the course of the following description.

Figure 1:
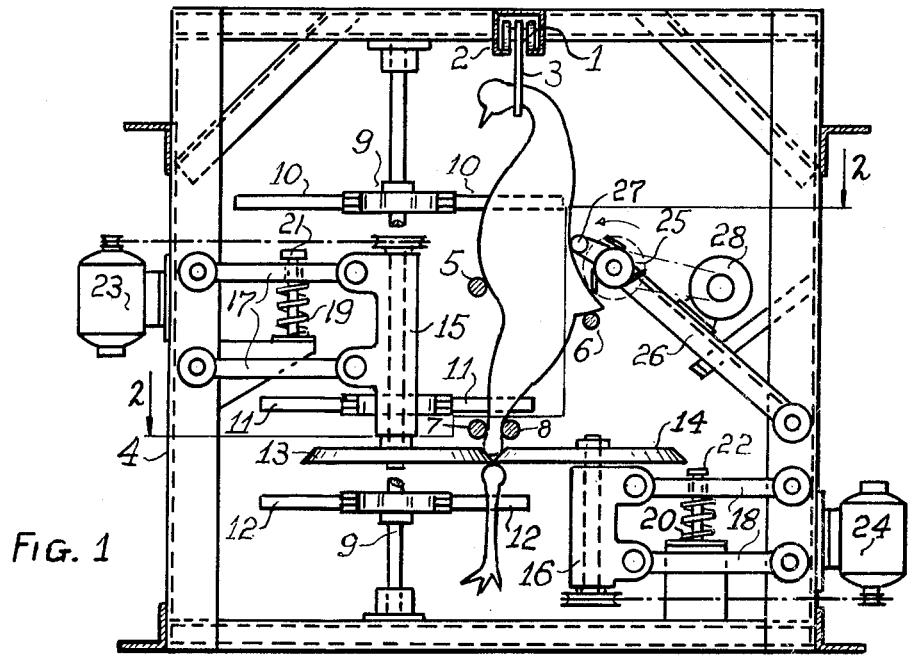
Figure 2:
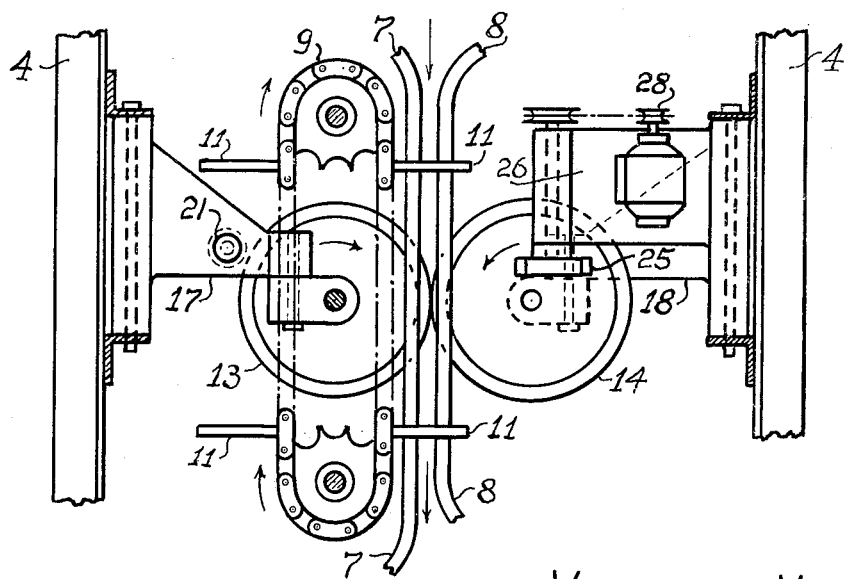

In the accompanying drawing, forming a part of the present application, wherein for the process of illustration, is shown a preferred from of my invention, FIGURE 1 is a vertical section showing the preferred form of my invention, FIGURE 2 is a section taken along line 2—2 of FIG. 1, with certain parts and the poultry carcass removed.

Referring more particularly to the drawing, in which like numerals are employed to designate like parts, the numeral 1 represents a poultry conveyor of the customary construction, having a continuous chain supported by rollers, running in channel shaped tracks 2. Attached to the conveyor chain at intervals are the shackles 3 engaging the neck of the carcass. These shackles are so positioned that the poultry carcass is transported sideways, that is, with one side pointing forward in the direction of motion of the conveyor. In the case illustrated the left side of the carcass leads. In the preferred form the conveyor 1 is supported by the frame 4 of the machine; in alternative forms my machine can be adapted to cooperate with existing overhead conveyor supported by independent structure, such as the ceiling of the building. Attached to the frame 4 are the guide bars 5, 6, 7 and 8; the former two are contacting the breast and the tail portion of the carcass, respectively, while 7 and 8 serve to engage the top of the leg joint of the carcass. These guide bars have curved ends and resilient mountings to permit the passage of the carcass with only a small resistance. In order to make the passage of the carcass through the machine positive, a mechanical pusher is provided in the form of the conveyor 9 which, in the case illustrated has three continuous chains carrying the pushing arms 10, 11 and 12, respectively.

An important element of my invention is the rotary oil gland cutter 25, which is mounted on the swinging arm 26 pivotally connected to the frame 4. The axis of rotation of the oil gland cutter 25 is preferably parallel to the direction of the movement of the carcass. The arm 26 is provided at its free end with a contact element 27, which rests on the back of the carcass during the cutting operation and limits the penetration of the cutter. Motor 28 furnishes the driving power for the cutter 25.

The other important elements of my machine are the rotary leg joint cutters 13 and 14, having parallel axes disposed at right angles to the direction of motion of the carcass, so spaced that the radial distance between the circular cutting edges of the two cutters is only a few thousandths of an inch at their nearest points. An important feature of the cutters 13 and 14 is their axial self-adjustability. As shown in the drawing, the tubular bearings 15 and 16 supporting the cutters 13 and 14, respectively, are connected to the frame 4 by the swinging arms 17 and 18, respectively, permitting a short axial movement of the cutters, independently from each other, as limited by the heads of the bolts 21 and 22, respectively. The springs 19 and 20 exert vertically directed pressures on the adjacent arms which more than compensate for the gravity, so that normally the cutters 13 and 14 assume their highest position defined by the heads of the bolts 21 and 22, respectively. Another important feature of the cutters 13 and 14 is the conical upper portions adjacent to the circular cutting edges, illustrated in FIG. 1 of the drawing. Motors 23 and 24 furnish driving power for the cutters 13 and 14, respectively. In alternative forms of my invention driving means of other types known in the art may be used. It is also within the spirit of my invention to obtain the self adjustability of the leg joint cutters 13 and 14 by making the tubular bearings 15 and 16 vertically slidable within the frame 4, or having the shafts of said cutters axially slidable within the bearings 15 and 16, or by having a slidable key connection between said cutters and the respective shafts. It is also feasible to utilize counter weights, instead of the springs employed in the form illustrated in the drawing.

The operation of my invention is as follows:

The carcass suspended in the shackle 3 is carried by the conveyor 1 to the machine and enters at the curved ends of the guide bars 5, 6, 7, and 8. There, the carcass is engaged by the advancing pusher arms 10, 11, and 12. When the carcass reaches the cutters 13 and 14 it is forced by the pusher arms 10, 11, and 12 forward against the cutters 13 and 14 and, due to the axial adjustability of these cutters, the circular cutting edges of the cutters will automatically slide into the depression between the knuckles of the leg joint, severing the connective tissues and avoiding the rupturing of the bone structure of the leg. Simultaneously, the conical upper parts of the cutters 13 and 14 will act as wedges separating the already severed leg joint, causing the discharge of the lower leg portion. As an additional and important effect, the conical upper portions of the cutters 13 and 14, assisted by the upward pressure produced by the springs 19 and 20, will raise the carcass until the upper knuckle of the leg joint is firmly engaged by the guide bars 7 and 8. As a result of this, the tail portion of the carcass will reach the contact element 27 and the cutter 25 will penetrate to the required depth for a complete removal of the oil gland of the carcass.

It is to be understood that the form described and illustrated is only an example of my invention and that various modifications in the shape, size, and arrangement of parts may be resorted to, without departing from the spirit of my invention or the scope of the subjoined claims.

I claim:

1. A poultry leg and oil gland remover comprising an overhead conveyor carrying a poultry carcass suspended by its neck and positioned with the side of the carcass forward in the direction of the movement; a frame; a rotary oil gland cutter having an axis parallel to the direction of the movement and being mounted on a swinging arm pivotally connected to said frame, said arm being provided with a contact element which rests on the back of said carcass during the cutting operation to limit the penetration of said oil gland cutter; a guide bar contacting the front portion of said carcass; a guide bar contacting the tail portion of said carcass; a pair of guide bars engaging the top of the leg joint of said carcass; a pair of circular rotary leg joint cutters having parallel axes disposed at right angles to the direction of movement of said carcass, each of said joint cutters being axially adjustable between predetermined limits and being subject to an upward directed spring pressure, permitting the edges of the joint cutters to slide in automatically into the space between the knuckles of the leg joint and to cut the connective tissues without the rupturing of the bone structure, each cutter having a conical upper portion adjacent to the cutting edge causing the separation of the knuckles of the severed leg joint and also the accurate positioning of the carcass for said oil gland cutter; a pushing conveyor adapted to force said carcass to pass between said leg joint cutters; driving means to operate said cutters and conveyors.

2. In combination with a conveyor carrying a poultry carcass sideways and suspended by its neck, a frame; a rotary oil gland cutter mounted on a swinging arm pivotally connected to said frame, the free end of said arm being provided with a contact element resting on the back of the carcass limiting the depth of the cut; a pair of guide bars mounted on said frame and engaging the top of the leg joint of said carcass; a pair of rotary leg joint cutters having parallel axes disposed perpendicularly to the direction of motion of said carcass, and having circular cutting edges spaced with a very small radial distance between their nearest points, each of said leg joint cutters being axially movable under upwardly directed spring pressure permitting the cutting edges to slide in automatically into the space between the knuckles of the leg joint and to cut the connective tissues without the rupturing of the bone structure of the leg, each of said leg joint cutters having a conical upper portion adjacent to said cutting edge causing the separation of said knuckles of the severed leg joint, and also the accurate positioning of the carcass for said oil gland cutter; a mechanical pusher adapted to force said carcass to pass between said leg joint cutters.

3. In a poultry processing machine the combination comprising a pair of guide bars engaging the top of the leg joint of the poultry; a pair of rotary leg joint cutters having closely spaced circular cutting edges and being axially movable under upwardly directed spring pressure permitting said cutting edges to slide in automatically into the space between the knuckles of the leg joint of the poultry and to cut the connective tissues without the rupturing of the bone structure of the leg, each of said leg joint cutters having a conical upper portion adjacent to the cutting edge causing the separation of said knuckles of the severed leg joint of the poultry; a mechanical pusher adapted to force the poultry to pass between said rotary leg joint cutters.

4. A device for removing poultry legs from a poultry carcass comprising a housing, means positioned within said housing for guiding the carcass through said housing, means coupled to said housing for forcing said poultry carcass through said guide means, and a pair of opposed leg joint cutters disposed in a plane substantially parallel to the direction of movement of said carcass for severing poultry legs passing therebetween, each of said cutters being axially adjustable in a vertical plane between predetermined limits in response to the position of said poultry legs.

5. A device for removing poultry legs from a poultry carcass comprising a housing, means positioned within said housing for guiding the carcass through said housing, means coupled to said housing for forcing said poultry carcass through said guide means, and a pair of opposed leg joint bladed cutters having their cutting blade axes disposed at substantially right angles to the direction of movement of said carcass for severing poultry legs passing therebetween, each of said cutters being axially adjustable in a vertical plane between predetermined limits in response to the position of said poultry legs, and each of said cutters being subjected to an upward-directed pressure.

6. A device for disjointing legs from a carcass comprising a housing, means coupled to said housing for guiding the carcass through said housing, means cooperating with said housing for forcing said carcass through said guide means, a first rotary leg joint cutter, a second rotary joint cutter, each of said cutters coupled to said housing and having axes parallel to each other and disposed at right angles to the direction of motion of said carcass through said housing, said cutters further having cutting edges spaced from each other at a distance to effect disjointing of carcass legs guided therebetween, and means coupled to said housing and to said cutters for permitting said cutters to move on their axes in a direction parallel to their axes.

7. A device in accordance with claim 6, wherein said last means comprises a plurality of springs.

8. A device in accordance with claim 7, wherein each of said springs biases each of said cutters in an upward direction.

9. A device in accordance with claim 6, wherein said cutting edges have a conical upper portion.

10. A device for disjointing carcass legs and removing oil glands from a poultry carcass comprising in combination, a housing, means coupled to said housing for guiding the carcass through said housing, means cooperating with said housing for forcing said carcass through said guide means, a first rotary joint cutter, a second rotary joint cutter, each of said cutters coupled to said housing and having axes parallel to each other and disposed at right angles to the direction of motion of said carcass through said housing, said cutters further having cutting edges spaced from each other at a distance to effect disjointing of carcass legs guided therebetween, means coupled to said housing and to said cutters for permitting said cutters to move on their axes in a direction parallel to their axes, a movable arm coupled to said housing, a rotary oil gland cutter mounted on said arm, said arm having a contact element which rests on the back of the carcass and limits the penetration of said oil gland cutter.

11. A device in accordance with claim 10 wherein said axis of rotation of said oil gland cutter is parallel to the direction of movement of the carcass through said housing.

12. A device in accordance with claim 10 wherein said cutting edges have a conical upper portion to urge said carcass to contact said rotary oil gland cutter.

13. A device for removing oil glands from a poultry carcass, comprising in combination a housing, guide means coupled to said housing for supporting the carcass in the housing, a movable arm coupled to said housing, a rotary oil gland cutter mounted on said arm, said arm having a contact element means which rests on the back of the carcass and limits the penetration of the oil gland cutter into the carcass.

14. A device in accordance with claim 13, including means for moving the carcass through said housing, and wherein said cutter includes blade means mounted in a plane substantially at right angles to the direction of movement of the carcass through said housing.

References Cited by the Examiner
UNITED STATES PATENTS

| 2,855,624 | 10/58 | Jerome et al. | 17—11 |
|---|---|---|---|
| 3,038,197 | 6/62 | Turner | 17—11 |

References Cited by the Applicant
UNITED STATES PATENTS

| 390,034 | 9/88 | Peckover. |
|---|---|---|
| 1,890,392 | 12/32 | Long. |
| 1,965,612 | 7/34 | Swanson. |
| 2,129,968 | 9/38 | Sargent et al. |
| 2,236,075 | 3/41 | Siemann. |
| 2,237,203 | 4/41 | Swanson. |
| 2,306,773 | 12/42 | Biffinger. |
| 2,310,881 | 2/43 | Swanson. |
| 2,381,044 | 8/45 | Franz. |
| 2,468,595 | 4/49 | Elmendorf. |
| 2,632,200 | 3/53 | Fortner et al. |
| 2,638,949 | 5/53 | Blevins et al. |

SAMUEL KOREN, *Primary Examiner.*

LUCIE H. LAUDENSLAGER, *Examiner.*